Aug. 25, 1964   I. CAPLAN   3,145,676
MANUFACTURE OF METAL TUBING
Filed June 14, 1960

United States Patent Office 3,145,676
Patented Aug. 25, 1964

3,145,676
MANUFACTURE OF METAL TUBING
Isadore Caplan, 336 Laburnum Crescent, Rochester 20, N.Y., assignor of one-half to Markin Tubing, Inc., Rochester, N.Y., a corporation of New York
Filed June 14, 1960, Ser. No. 35,975
2 Claims. (Cl. 113—33)

The present invention relates to the manufacture of metal tubing and, more particularly, to a process for continuously pickling and, if desired, plating the tubing during its manufacture from sheet or strip stock and before cutting to size.

An object of the invention is to provide a generally improved and more satisfactory process for manufacturing metal tubing and producing a length of bright, oiled tubing as the end product of a continuous operation.

Another object is the provision of an improved method of manufacturing electric welded tubing more economically than in the past including the steps of pickling and, if desired, plating.

Yet another object is to provide a new and improved process of the foregoing kind wherein only the outside surfaces of the tubing are pickled and plated.

A further object of the invention is the provision of a new and improved continuous process for manufacturing welded steel tubing which includes the step of pickling immediately following the welding and a brief rinsing and cooling of the tubing before sizing and cutting off.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
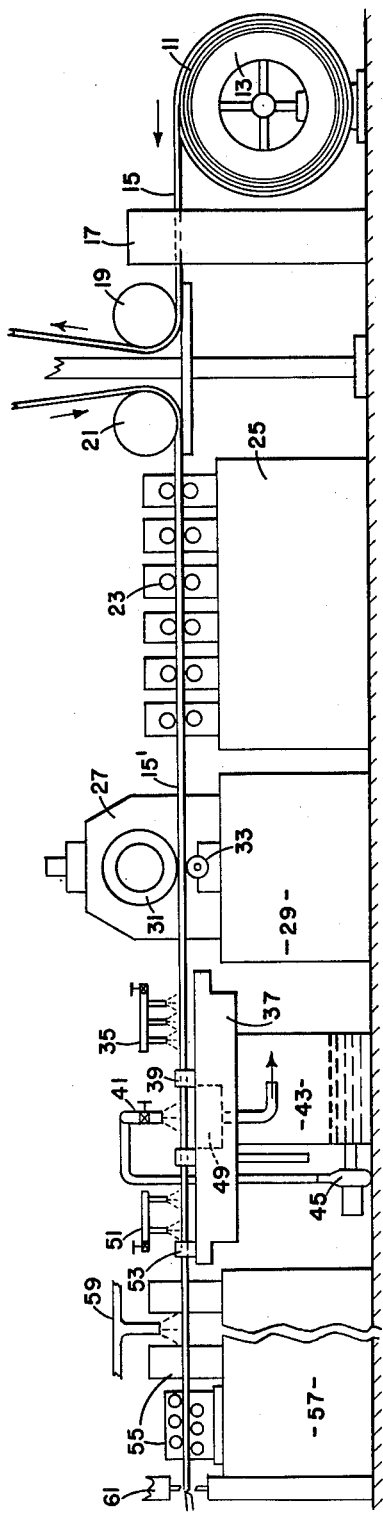
FIG. 1 is a front elevational view, partially diagrammatic, of a tube mill employing the process according to the invention.

The machine illustrated in FIG. 1 manufactures metal tubing from flat strip stock and is commonly known as a tube mill. The process is continuous, producing as an end product a length of bright, lustrous tubing cut to a desired size. The raw material from which the tubing is made is provided in the form of a roll 11 of flat strip stock and is mounted for rotation on a large supply roller 13 for feeding into the front end of the machine. It is desirable to make provision for continuing the feed of the strip stock into the machine without break even though the end of one supply roll 11 is reached and it is necessary to mount another roll on the roller mechanism 13. To this end, the feeding end 15 of the roll 11 passes in the vicinity of a butt welding machine 17, here shown diagrammatically. Thereafter the metal strip 15 passes over the input roller 19 of a looper wherein the strip is stored in order to keep the tube mill running continuously when butt welding the end of one supply coil 11 to the start of the next coil. In the looper, the strip end 15 passes upwardly over a movable carriage (not here shown) and then downwardly over an output roller 21 to feed the strip end into the beginning of the tube mill proper.

The movable carriage may be mounted along the ceiling of the room, for instance, and move inwardly when the butt welding is taking place, to supply a feed over the output roller 21 even though feed into the input roller 19 is temporarily stopped. The looper or storage elevator as described and also the butt welding machine 15 may be of any suitable kind, since this is not important to the present invention.

Although other metals may be used, the present process is preferably used for making steel tubing from steel strip, and will be described with reference to this material. The apparatus to be discussed is appropriate for tubing about ¼" to ¾" in diameter, although it is to be understood that the process itself is applicable to smaller or larger tubing sizes. In the tube mill, the flat steel strip is first formed into an approximately circular cross section by a series of pairs of forming rollers 23 mounted on the top of a base 25. The pairs of forming rollers 23 gradually curve the sides of the steel strip upwardly to butt together at the top. At this point, the steel strip 15 has been formed into a tube and is now designated by the numeral 15'.

The tube 15' next passes through a welding head 27 so that the butt seam of the tubing may be permanently secured together. It will be understood that the weld extends in a longitudinal direction of the tubing 15' and thus may be performed continuously. A butt seam electric resistance weld is desirably performed, and for this purpose the welding unit 27 includes a transformer for supplying a large current and may be contained within the welder base 29. The electrodes for the electric resistance welding are provided by a pair of circular plates 31 formed at their edges with a groove to roll on top of the tubing 15'. The tubing as it rolls past the electrodes 31 is supported by a lower roller 33. It is clear that electric current passes from one of the electrodes 31 through a portion of the tubing 15', and back into the other of the electrodes 31. The large amount of heat generated in the area of the butt seam welds the seams together, and the exterior weld flash may be trimmed off with a cutting tool, though not here shown. At this point the tubing 15' has been closed so that no subsequent liquids to be poured over the tubing in the portion of the process to follow can get into the tubing.

The welded and trimmed tubing 15' next passes to a preliminary rinsing and cooling stand and acid pickling system. It is at this point that the novelty of the process occurs, in continuously pickling the steel tubing on the tube mill immediately after welding but before sizing and cutting the tube to length. As will be explained in greater detail later, sizing involves forming the tubing into an approximately true round shape, after which the tube may be cut off in any desired lengths. The step of pickling involves immersing or pouring over the tubing an appropriate acid or other suitable pickling solution for the primary purpose of removing iron oxides from the external surface of the tubing caused by the heating of steel when welding. Other oxides which may be removed are those caused by the atmosphere during storage of the raw material sheet or strip in warehouses over long periods of time. Oxides may also form on the surface of the raw material strip or sheet due to the occasional low quality finishing in the steel mills. The effect of the pickling step is also to clean and brighten the tube so that it has a lustrous appearance.

Most steel strip and sheet is delivered to the tubing manufacturer with a petroleum base rust preventative on its surface. This material ordinarily prevents or slows pickling. In the present process when the tubing is electric resistance welded, the tubing gets hot enough to vaporize oils in the weld area and to liquefy it in other areas. Welding raises the temperature of the tube to a mean temperature of approximately 300° Fahrenheit, and at this elevated temperature the resistance of the oil to the pickling acid is eliminated. The elevated temperature promotes the speed of the reaction of the chemicals, regardless of the oil. In the cooling and pickling stand, water is first poured over the tubing 15' from one or more spigots 35. The water is desirably ordinary tap water and serves to slightly cool the tubing as well as to wash away portions of the residual oils. The water is collected in a sink or trough 37 provided on the rinsing and cooling stand. Excess water and oil is desirably removed by an air wiper or blast 39.

Figure 2:
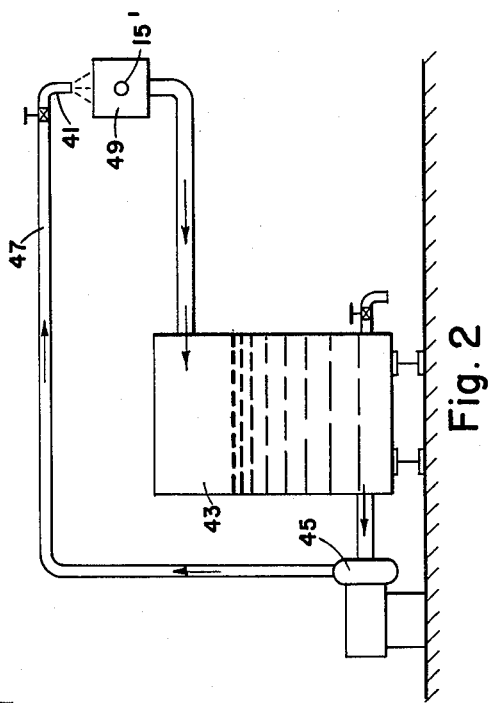
FIG. 2 is a side elevational view of a recirculation system shown in FIG. 1.

Following the water rinsing, cooling and air blasting, pickling acid is poured over the tubing 15' from a faucet 41, exactly in the same manner as drawing water from a faucet. For steel tubing the acid used is preferably hydrochloric acid, in a range of compositions from 5° to 50° Baumé. For a number of reasons, the hydrochloric acid is desirably recirculated. To this end, referring also to FIG. 2, the pickling acid is stored in a supply tank 43 from which it is pumped by a motor 45 into an elevated pipe 47 to which the faucet 41 is attached. After pouring over the tubing 15', the pickling acid is collected in an acid sink 49 and delivered by gravity back to the supply tank 43. Of course, any suitable recirculation system may be employed, and the apparatus illustrated may be replaced by apparatus of other appropriate types.

It may be noted that the pickling acid acts only on the outside of the tubing 15'. This results not only in a saving of material, but has the advantage that the unaffected and dry internal surfaces of the tubing cause less product spoilage. At the beginning of the process the pickling acid is preferably at room temperature. Atfer about one hour of operation, the acid stabilizes at a temperature in the order of 130° Fahrenheit in one arrangement which operates well. The tubing heats the acid, while the acid contributes to cooling the tube. As the acid flows over the tubing, it reacts and removes as dissolved products all iron oxides in accordance with the well known reactions. The gradual increase of iron chloride in the acid increases the strength of the acid. The elevated temperature of the acid permits some of the hydrochloric acid to escape as a gas from solution while pouring over the tube, further increasing the pickling action. The entire pickling immersion requires only about three to eight seconds.

Other pickling solutions than hydrochloric acid may be used. The use of sulphuric acid is possible in this process, although sulphuric acid is less desirable than hydrochloric acid because it becomes exhausted sooner due to the creation of ferric and ferrous sulphates. However, sulphuric acid is more desirable in certain subsequent chemical plating processes. The use of other proprietary solutions of the pickling process is possible even if there are inhibitors in the solutions and even if there are wetting agents. The process according to the invention is intended to cover and include any and all suitable pickling solutions.

Following the pickling bath, the continuously advancing tube 15' is rinsed with fresh water to eliminate all traces of acid. Conveniently, water is discharged from tubes or faucets 51 and the rinse water is collected in the trough 37. The rinse water additionally serves to cool the tubing 15'. Thereafter an air wiper 53 is desirably used to blast rinse water off the tube.

The welded, pickled and cooled tube is now passed through a plurality of sizing stands 55 mounted on a base 57. The purpose of this step is to make the tubing approximately true round. The sizing stands 55 generally comprise a pair of opposing rollers either vertically or horizontally separated from one another. A coolant oil is also discharged from a tube 59 and splashes over the tubing 15' during its transit through the sizing stands. The coolant is conveniently a water soluble oil containing a water soluble deactivator such as sodium nitrite .1% to 2.0% weight in sixty gallons of coolant. The soluble oil, normally used as coolant and lubricant on a tube, is the carrier of a surface deactivator for a previously pickled tube.

The bright, clean and oiled tubing passes to the final step of the process in which it is cut off to a desired length. A suitable cutoff and run-out machine 61 is provided having also a length measuring mechanism.

Figure 3:
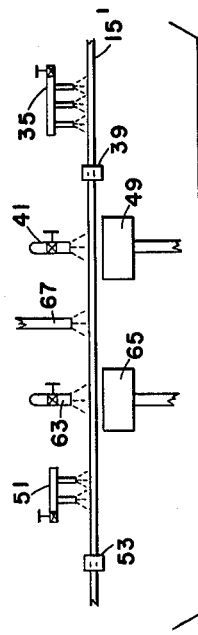
FIG. 3 is a diagrammatic elevational view of only the modified portion of another embodiment of the invention additionally including a plating step.

In the modification of FIG. 3, the additional step of plating is included between the pickling bath and the water rinse. It will be understood that the remainder of the process is the same as previously described. Plating involves the chemical deposition of non-ferrous metals on the tubing by pouring an appropriate liquid over the tube in the same manner as the pickling acid. Thus, an additional discharge tube or faucet 63 is provided on the cooling and pickling stand, the liquid therefrom splashing over the tube and being collected in a sink 65. Pickling acid is first desirably removed or diluted by a small stream of water from a faucet 67. The plating solution may be recirculated in the same manner and by similar apparatus as is provided for the pickling solution. For a copper plating, liquid copper sulphate is poured over the tube and the copper ions displace iron ions from the steel tubing surface resulting in a very thin bright copper plating. The same may be done with tin plated from tin phosphite. Zinc and nickel plating may be accomplished in an analogous manner. The end product of this process is that the cut-off tubing is not only clean and bright and oiled, but also pickled and plated.

The advantages of the process according to the invention primarly involves the reduction of cost in producing bright, pickled, or plated tubing. This can thus be seen by comparing the common prior practice of cutting the tube to length in the tube mill, and thereafter performing a batch process if the manufacturer desires to pickle the tubing or to prepare the tubing for plating or painting. The continuous process is clearly time saving and labor saving as compared to the completely separate batch processing for pickling and plating, and takes up less space.

Another advantage of the present process arises in the fact that only the external surface of the tubing is pickled and plated. The economic penalty of treating internal surfaces which do not require treatment is not present. Furthermore, the unaffected and dry internal surfaces of tubing produced as presently described causes less product spoilage.

The smooth bright surface of the tubing facilitates further machining done by the consumer and reduces his finishing costs. The appearance of the end product tubing is generally improved. It is possible to add copper or other plating chemically, as a thin adherent and bright coat. The plating enhances the bright attractive appearance of the tubing.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. The continuous process of manufacturing butt-welded and non-annealed steel tubing in continuous lengths having a bright and substantially scale-free exterior surface, comprising the steps of advancing steel stock continuously past successive stations at which the stock is formed to an approximately circular cross section with a longitudinal seam, butt welding the seam, applying cooling liquid to the welded tubing to cause partial cooling thereof in the area of the welded seam, applying pickling acid to the partially cooled tubing to remove any scale resulting from oxidation caused by the heat of the welding operation, and sizing the tubing to true the cross sectional shape thereof, said process being characterized by the novel feature that the pickling acid is applied to the tubing while the tubing is still relatively hot from the welding operation, thus promoting the speed of the pickling reaction without requiring reheating after welding, and that the pickling acid is applied to the tubing in advance of the sizing operation, so that the pickling reaction is not impeded by any oil used as a lubricant in the subsequent sizing operation.

2. Apparatus for the continuous manufacture of butt-welded and non-annealed steel tubing in continuous lengths having a bright and substantially scale-free exterior surface, comprising means for advancing steel stock continuously, means for forming the advancing stock to an approximately circular cross section with a longitudinal seam, means for applying heat to the advancing stock for butt welding the seam, means for applying cooling liquid to the advancing welded tubing to cause partial cooling thereof in the area of the welded seam, means for applying pickling acid to the partially cooled advancing tubing to remove any scale resulting from oxidation caused by the heat of the welding operation, and means for sizing the advancing tubing to true the cross sectional shape thereof, said apparatus being characterized by the novel feature that said means for applying pickling acid is located in a position along the line of advancing travel of the tubing where the tubing is still relatively hot from the welding operation, so that the pickling reaction occurs rapidly under the influence of retained heat from the welding operation without requiring reheating after welding, and is located in a position before the advancing tubing reaches said means for sizing the tubing, so that the pickling reaction is not impeded by any oil used as a lubricant in connection with said means for sizing the tubing.

References Cited in the file of this patent

UNITED STATES PATENTS

| | | |
|---|---|---|
| 1,685,269 | Bundy | Sept. 25, 1928 |
| 2,264,885 | Mueller | Dec. 2, 1941 |
| 2,359,095 | Elder et al. | Sept. 26, 1944 |
| 2,822,291 | Hahn | Feb. 4, 1958 |
| 2,876,132 | Worden et al. | Mar. 3, 1959 |
| 2,927,371 | Hays | Mar. 8, 1960 |
| 2,982,312 | Caplan et al. | May 2, 1961 |
| 3,017,494 | Mackey | Jan. 16, 1962 |

FOREIGN PATENTS

| | | |
|---|---|---|
| 552,126 | Great Britain | Mar. 24, 1943 |